US011755459B2

(12) United States Patent
Segev et al.

(10) Patent No.: US 11,755,459 B2
(45) Date of Patent: Sep. 12, 2023

(54) MANAGEMENT OF A DEBUG BUFFER BASED ON PRIORITY INFORMATION

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

(*) Notice: Subject to any disclaimer, the term of this patent is extended or adjusted under 35 U.S.C. 154(b) by 141 days.

(21) Appl. No.: 17/210,091

(22) Filed: Mar. 23, 2021

(65) Prior Publication Data
US 2022/0308986 A1    Sep. 29, 2022

(51) Int. Cl.
| | |
|---|---|
| G06F 11/00 | (2006.01) |
| G06F 11/36 | (2006.01) |
| G06F 11/10 | (2006.01) |
| G06F 3/06 | (2006.01) |
| G06F 12/1081 | (2016.01) |
| G06F 11/07 | (2006.01) |

(52) U.S. Cl.
CPC ........ G06F 11/3656 (2013.01); G06F 3/0619 (2013.01); G06F 3/0656 (2013.01); G06F 3/0679 (2013.01); G06F 11/0781 (2013.01); G06F 11/1068 (2013.01); G06F 11/366 (2013.01); G06F 12/1081 (2013.01)

(58) Field of Classification Search
CPC .. G06F 11/3656; G06F 3/0619; G06F 3/0656; G06F 3/0679; G06F 11/0781; G06F 11/1068; G06F 11/366; G06F 12/1081
See application file for complete search history.

(56) References Cited

U.S. PATENT DOCUMENTS

| | | | |
|---|---|---|---|
| 8,898,359 B2 | 11/2014 | Freking et al. | |
| 9,568,547 B2 | 2/2017 | Menon et al. | |
| 10,296,440 B2 * | 5/2019 | Gamble | G06F 11/362 |
| 10,534,687 B2 | 1/2020 | Fahim et al. | |
| 10,585,822 B2 | 3/2020 | Lee et al. | |
| 10,673,439 B1 * | 6/2020 | Ahmad | H03K 19/17728 |
| 10,705,142 B2 | 7/2020 | Pappu et al. | |
| 10,896,119 B1 * | 1/2021 | Ansari | G06F 11/364 |
| 11,231,987 B1 * | 1/2022 | Bose | G06F 11/327 |
| 2003/0233601 A1 * | 12/2003 | Vaid | G06F 11/364 714/42 |
| 2012/0131555 A1 * | 5/2012 | Hossain | G06F 11/362 717/124 |
| 2014/0013172 A1 * | 1/2014 | Hopkins | G06F 11/263 714/724 |
| 2015/0052405 A1 * | 2/2015 | Maiolani | G06F 11/3656 714/45 |

(Continued)

*Primary Examiner* — Loan L. T. Truong
(74) *Attorney, Agent, or Firm* — PATTERSON & SHERIDAN, LLP; Steven H. VerSteeg

(57) ABSTRACT

A data storage device includes a memory device and a controller coupled to the memory device. The controller is configured to receive new debug information, determine that a debug buffer does not have any available free entries for the new debug information, compare the priority information to a lowest priority information of old debug information stored in the debug buffer, remove a most recent old debug information that has a lowest priority information from the debug buffer, and place the new debug information and corresponding priority information in the debug buffer.

11 Claims, 8 Drawing Sheets

(56) References Cited

U.S. PATENT DOCUMENTS

| | | | |
|---|---|---|---|
| 2015/0149843 A1* | 5/2015 | Finan | G01R 31/318519 |
| | | | 714/726 |
| 2016/0110275 A1* | 4/2016 | Michalovich | G06F 13/28 |
| | | | 714/43 |
| 2016/0378637 A1* | 12/2016 | Gamble | G06F 11/362 |
| | | | 707/702 |
| 2017/0045584 A1* | 2/2017 | Hopkins | G01R 31/31705 |
| 2017/0161171 A1* | 6/2017 | Batzdorff | G06F 11/3624 |
| 2018/0150286 A1* | 5/2018 | Speirs | G06F 8/452 |
| 2019/0114218 A1 | 4/2019 | Yun et al. | |
| 2021/0019219 A1* | 1/2021 | Patel | G06F 9/3822 |
| 2021/0182181 A1* | 6/2021 | Vezier | G06F 11/3664 |
| 2021/0226903 A1* | 7/2021 | Kwong | H04L 49/90 |
| 2023/0134277 A1* | 5/2023 | K | G06F 11/3636 |
| | | | 717/125 |

* cited by examiner

MANAGEMENT OF A DEBUG BUFFER BASED ON PRIORITY INFORMATION

BACKGROUND OF THE DISCLOSURE

Field of the Disclosure

Embodiments of the present disclosure generally relate to data storage devices, such as solid state drives (SSDs), and managing bandwidth allocation.

Description of the Related Art

Non-Volatile Memory (NVM) Express (NVMe) SSDs are coupled to host device via a Peripheral Component Interconnect (PCI) Express (PCIe) interface. The PCIe interface satisfies the required protocol, such as meeting a given performance requirement of the PCIe protocol. The PCIe interface may be used to transfer user data between the SSD and the host device. When a bug is detected at the SSD, but the other "side" signaling is not connected, the NVMe/PCIe interface is utilized to send the debug information to the host device.

However, the PCIe interface has certain bandwidth limitations. When the bandwidth limit of the PCIe interface is reached or exceeded, the performance of the PCIe interface may decrease and transfer latency may increase. By loading the PCIe interface with sideband information, the performance of the PCIe interface may be decreased due to reaching or exceeding the bandwidth limit of the PCIe interface. In addition to the lower performance, the detected bug may be irreproducible and thus, the bug may not be debugged. The PCIe interface may also be used to send management information or information from other functions. The management information or information from other functions may utilize some of the bandwidth of the PCIe interface.

Therefore, there is a need in the art for an improved method of managing bandwidth allocation of the PCIe interface.

SUMMARY OF THE DISCLOSURE

The present disclosure generally relates to data storage devices, such as solid state drives (SSDs), and managing bandwidth allocation. A data storage device includes a memory device and a controller coupled to the memory device. The controller is configured to receive new debug information, determine that a debug buffer does not have any available free entries for the new debug information, compare the priority information to a lowest priority information of old debug information stored in the debug buffer, remove a most recent old debug information that has a lowest priority information from the debug buffer, and place the new debug information and corresponding priority information in the debug buffer.

In one embodiment, a data storage device includes a memory device and a controller coupled to the memory device. The controller is configured to receive new debug information, where the new debug information includes priority information, determine that a debug buffer does not have any available free entries for the new debug information, compare the priority information to a lowest priority information of old debug information stored in the debug buffer, remove either a most recently stored old debug information that has a lowest priority information or a least recently stored old debug information that has a lowest priority information from the debug buffer, and place the new debug information and corresponding priority information in the debug buffer.

In another embodiment, a data storage device includes a memory device and a controller coupled to the memory device. The controller includes a write path, a control path, a flash interface module (FIM), an error correction module coupled to the FIM, and a direct memory access (DMA) module coupled to the error correction module, where the DMA module comprises a bandwidth module, and an information collector module coupled to the control path, the write path, and the DMA. The information collector is configured to receive sideband data from the write path, the control path, the FIM, and the error correction module.

In another embodiment, a data storage device includes memory means and controller means. The controller means are configured to collect debug information, collect priority information of the collected debug information, store the debug information and the priority information in a debug buffer, remove old debug information from the debug buffer without sending the old debug information to a DMA, and send remaining debug information from the debug buffer to the DMA after removing old debug information from the debug buffer, where the remaining debug information is distinct from the old debug information.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and managing bandwidth allocation. A data storage device includes a memory device and a controller coupled to the memory device. The controller is configured to receive new debug information, determine that a debug buffer does not have any available free entries for the new debug information, compare the priority information to a lowest priority information of old debug information stored in the debug buffer, remove a most recent old debug information that has a lowest priority information from the debug buffer, and place the new debug information and corresponding priority information in the debug buffer.

Figure 1:
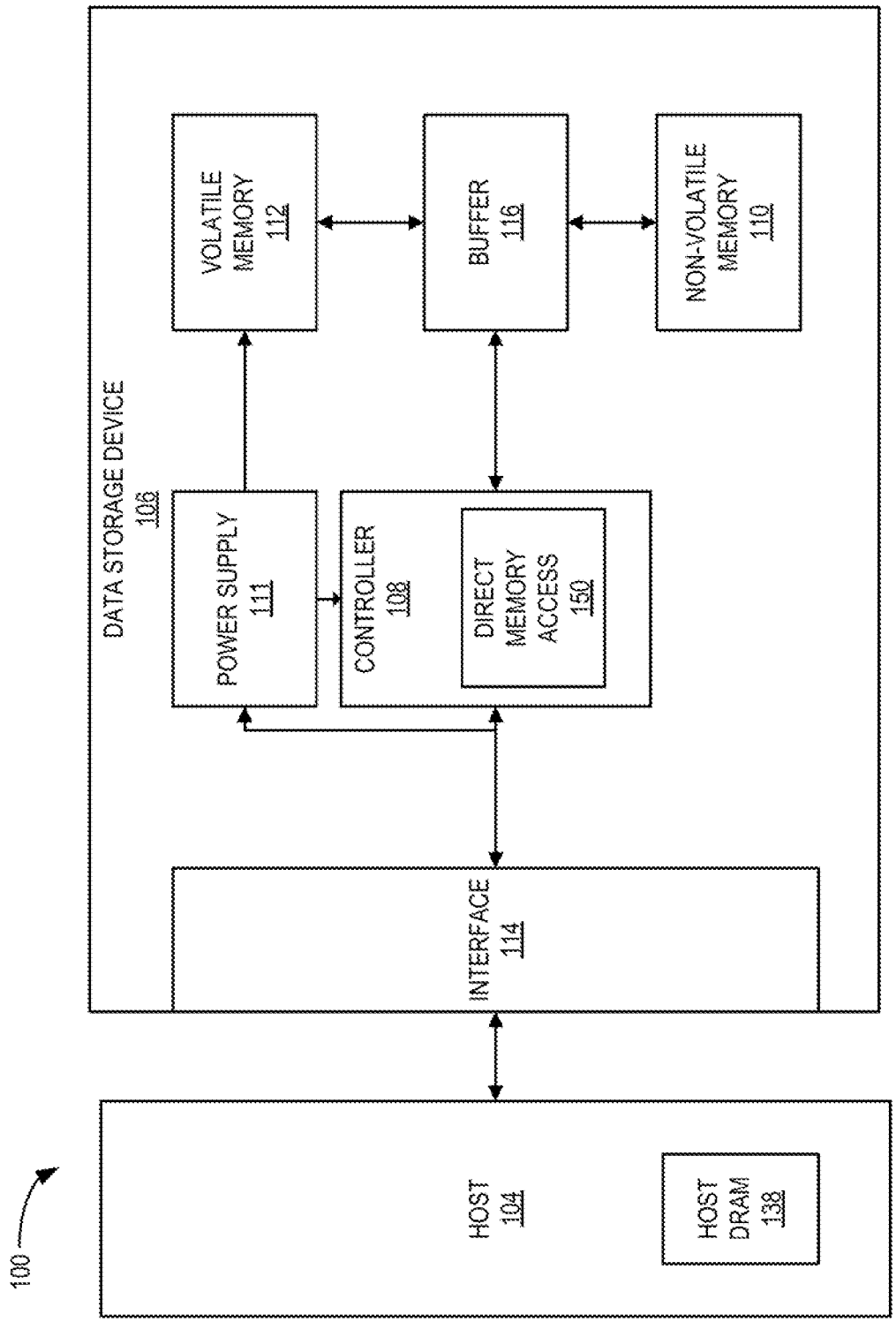
FIG. 1 depicts a schematic block diagram illustrating a storage system in which data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command.

The controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. The controller 108 includes a direct memory access (DMA) module 150. The DMA module 150 may be configured to send or receive data directly to and from the NVM 110. The sending and receiving of data may occur without a central processing unit (CPU) involvement, such that the speed of the memory operations of sending and receiving of data directly to and from the NVM 110 is increased.

Figure 2:
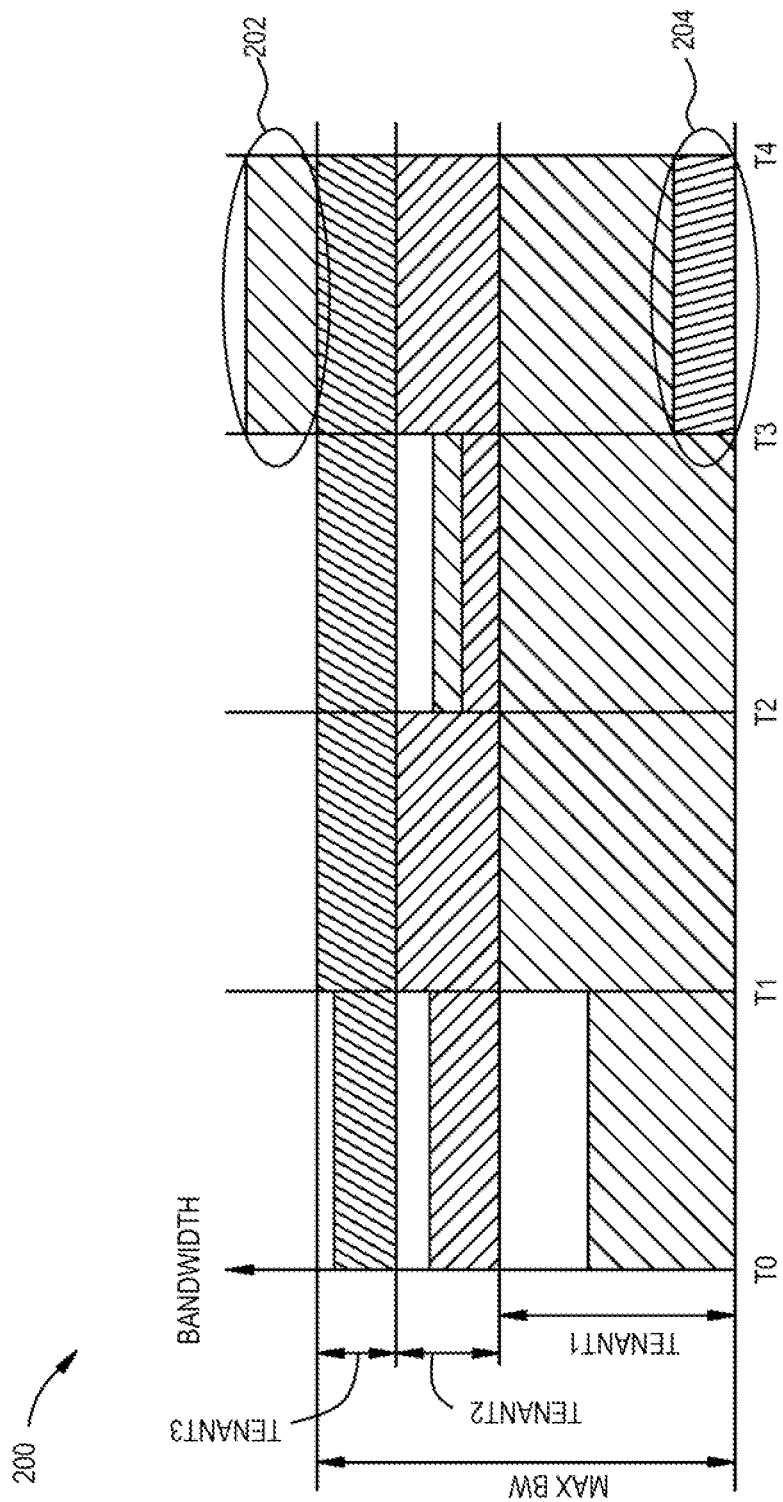
FIG. 2 depicts a schematic illustration of a graph of bandwidth degradation over a period of time for a set number of tenants, according to certain embodiments.

FIG. 2 depicts a schematic illustration of a graph 200 of bandwidth degradation over a period of time for a set number of tenants, according to certain embodiments. The graph 200 may describe the bandwidth utilization of a DMA, such as the DMA 150 of FIG. 1, where the x-axis represents time (T) and the y-axis represents a bandwidth utilization. The maximum bandwidth (MAX BW) represents the maximum bandwidth of the DMA 150, where the maximum bandwidth is the maximum bandwidth that exists between a data storage device, such as the data storage device 106 of FIG. 1, and a host device, such as the host device 104 of FIG. 1.

The bandwidth of the DMA 150 is split between each tenant, such as each virtual host machine of the host device 104. Each of the tenants is allocated a guaranteed bandwidth, where the guaranteed bandwidth may be the same or different between each of the tenants. As illustrated in the graph 200, the guaranteed bandwidth for Tenant1 is greater than the guaranteed bandwidth for both Tenant2 and Tenant3.

Between T0 and T1, each of the tenants do not have enough data being transferred to consume their entire respective guaranteed bandwidth. Thus, each of the tenants are utilizing less than their respective guaranteed bandwidth. Between T1 and T2, the data being transferred for each of the tenants has increased and each tenant is consuming the respective guaranteed bandwidth. The total consumed bandwidth between T1 and T2 equals the maximum bandwidth. Between T2 and T3, Tenant1 needs more bandwidth than the guaranteed bandwidth for Tenant1. Because Tenant2 is using less than the allocated guaranteed bandwidth, the difference may be provided to Tenant1 to use.

Between T3 and T4, the guaranteed bandwidth for Tenant2 and Tenant3 are fully consumed by Tenant2 and Tenant3 respectively. However, sideband data, such as debug information, consumes part of the maximum bandwidth, as indicated by the sideband data bandwidth 204. Thus, Tenant1, when requesting to consume the guaranteed bandwidth, is not able to utilize the entire guaranteed bandwidth for Tenant1, as indicated by Tenant1 lost bandwidth 202. Therefore, the quality of service (QoS) or the performance of the DMA 150 is degraded as the DMA 150 may no longer be able to fully service the bandwidth needs of Tenant1.

Because the DMA 150 may no longer be able to fully service the bandwidth needs of the tenants, the performance requirements of the interface protocol, such as PCIe protocol, may no longer be met and additional information corresponding to a bug (i.e., debug information) may no longer be transferred. Thus, a bug in an error correction module may not be re-created and the bug may not be debugged.

Figure 3:
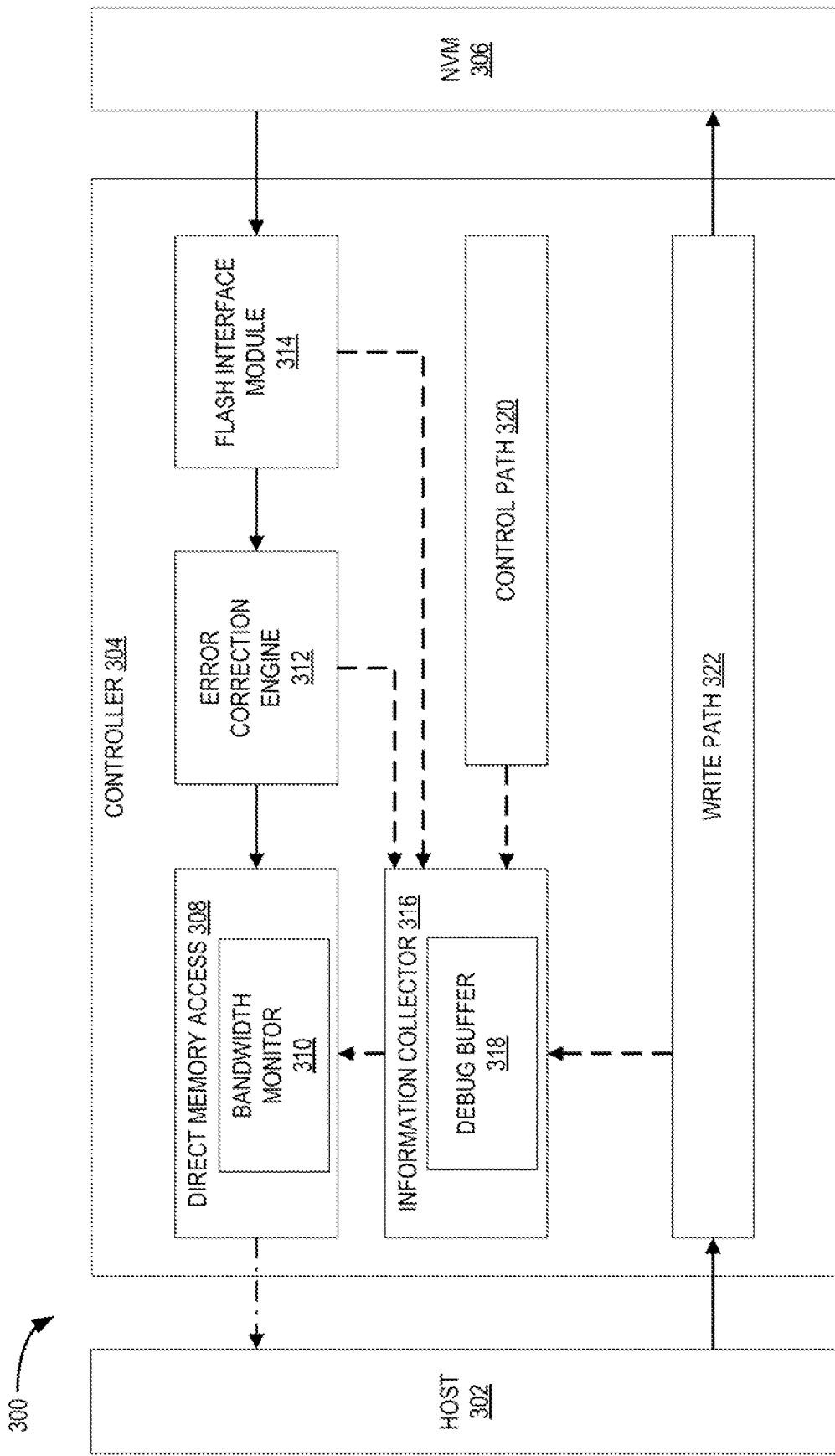
FIG. 3 depicts a schematic block diagram of a controller including balancing added logic interacting with a host device and a memory device, according to certain embodiments.

FIG. 3 depicts a schematic block diagram 300 of a controller 304 including balancing added logic interacting with a host device 302 and a memory device, such as an NVM 306, according to certain embodiments. In the schematic block diagram 300, the transfer of user data is indicated by a solid line, the transfer of sideband data is indicated by a dashed line, and the transfer of mixed data, which includes both user data and sideband data, is indicated by a dashed dotted line. The controller 304 includes a DMA 308 that includes a bandwidth monitor 310, where the DMA 308 is coupled an error correction module 312, where the error correction module 312 is coupled to a flash interface module (FIM) 314, an information collector 316 that includes a debug buffer 318, a control path 320, and a write path 322.

The FIM 314 is used to read and write user data to and from the NVM 306. The user data is passed through the error correction module 312. The error correction module 312 may scan the user data for any errors, such as bit flips, and apply the appropriate correction method to correct the errors. The user data is then passed to the DMA 308, where the user data is sent to the host device 302 as part of the mixed data. The DMA 308 includes the bandwidth monitor 310, which monitors the bandwidth usage of each of the different tenants as well as measures the amount of unused bandwidth. The bandwidth monitor 310 may also distribute the available unused bandwidth to each of the different tenants as appropriate. When the host device 302 schedules data to be written to the NVM 306, the user data is passed through the write path 322. The write path 322 may include encoder engines, write gateways, and the like. The user data is then programmed to the NVM 306 after going through the write path 322.

The error correction module 312, the FIM 314, the control path 320, and the write path 322 each generates sideband data. The sideband data is aggregated at the information collector 316. The debug buffer 318 of the information collector 316 may store and organize the received sideband data. For example, the received sideband data may be organized or categorized by priority, where the priority may be dependent on age of the received sideband data or importance of the received sideband data. Furthermore, in certain embodiments, the debug buffer 318 is part of a volatile memory of the controller 304, such as DRAM. In other embodiments, the debug buffer 318 is part of a on chip volatile memory of the data storage device, such as SRAM.

The aggregated sideband data is sent to the DMA 308 and is transferred to the host device 302 as part of the mixed data. Because the aggregated sideband data is part of the mixed data, the aggregated sideband data bandwidth is monitored by the bandwidth monitor 310. The aggregated sideband data may be considered a tenant since the aggregated sideband data consumes some of the bandwidth of the DMA 308.

It is to be understood that in the description herein, sideband data and debug information may be referenced interchangeably.

Figure 4A:
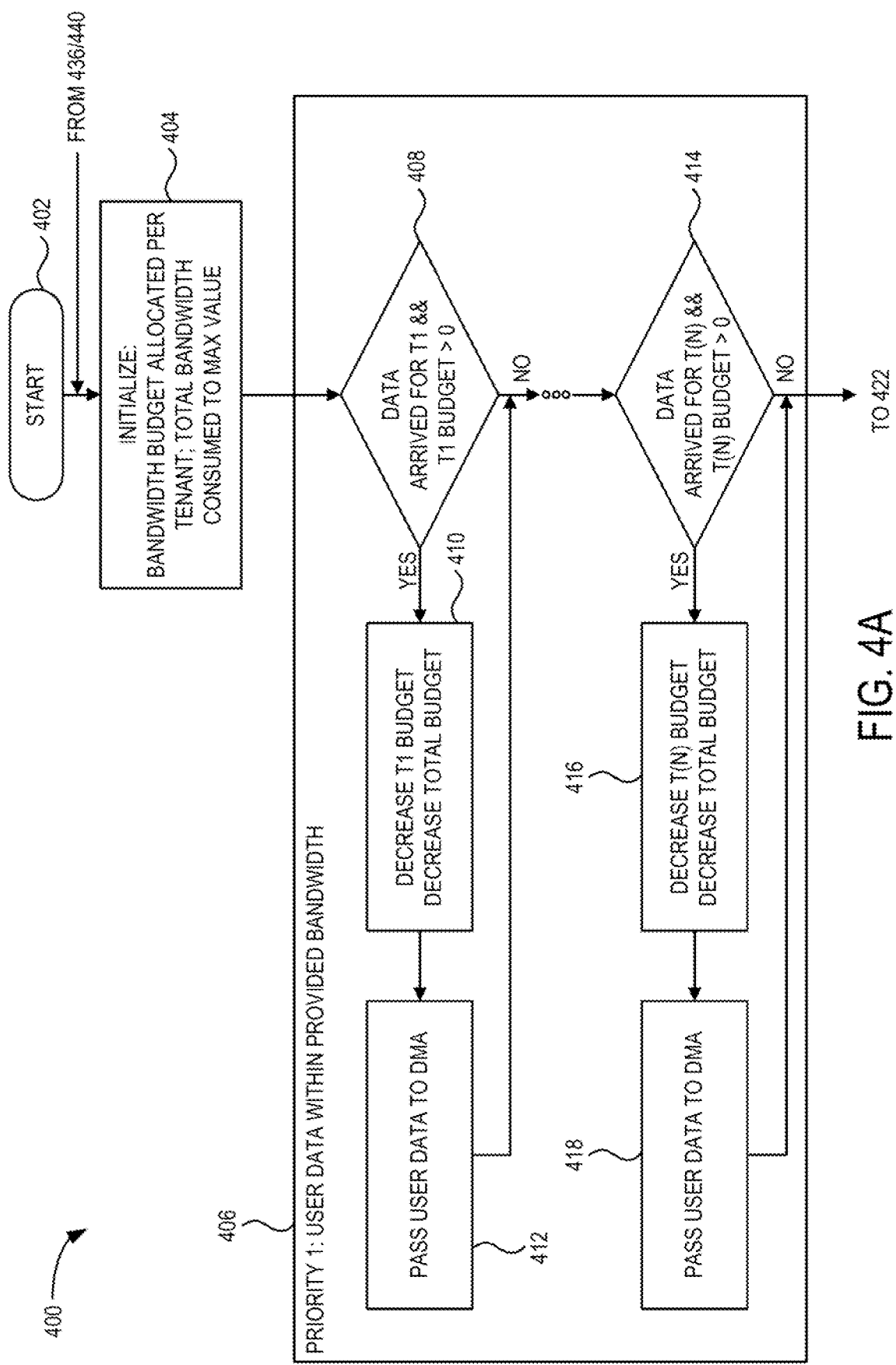
FIGS. 4A-4C depict a flowchart illustrating a method of managing an allocation of bandwidth for a number of tenants, according to certain embodiments.
Figure 4B:
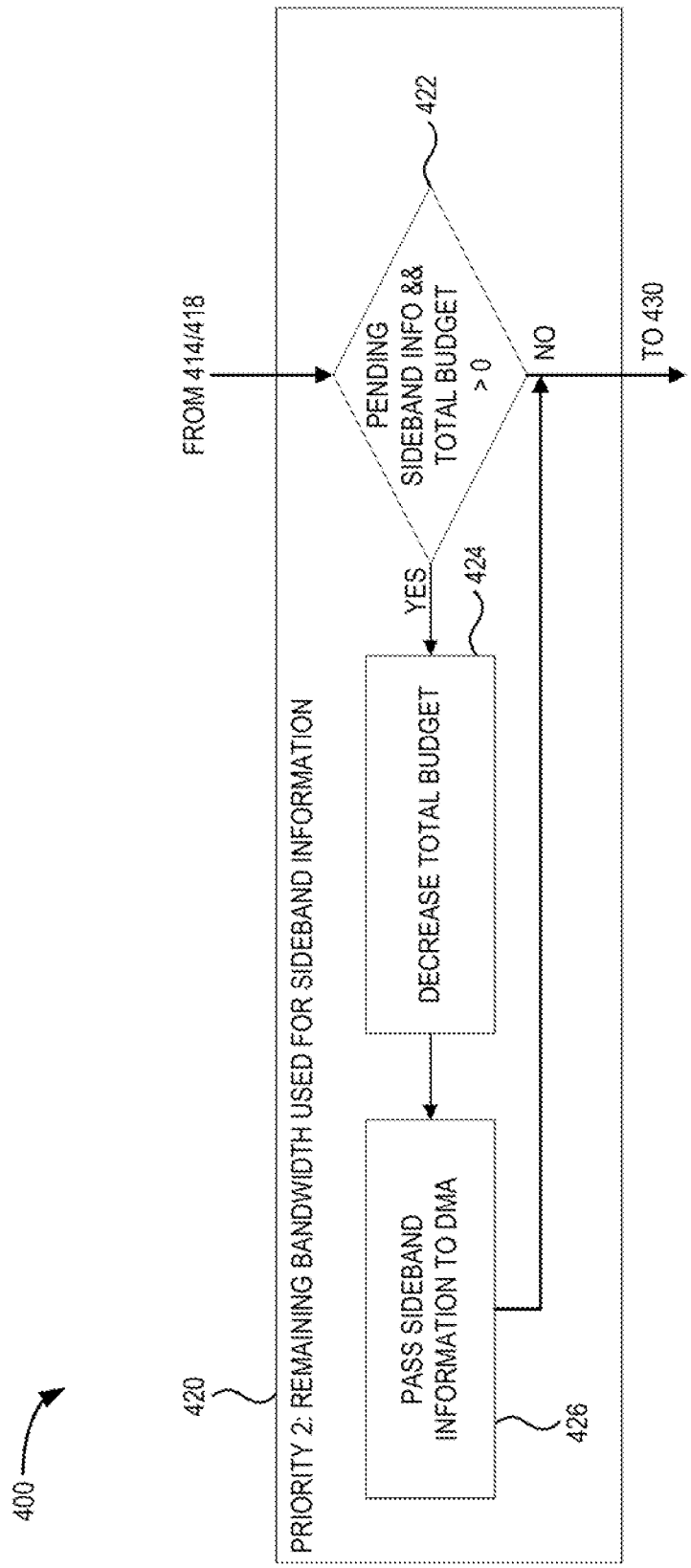
Figure 4C:
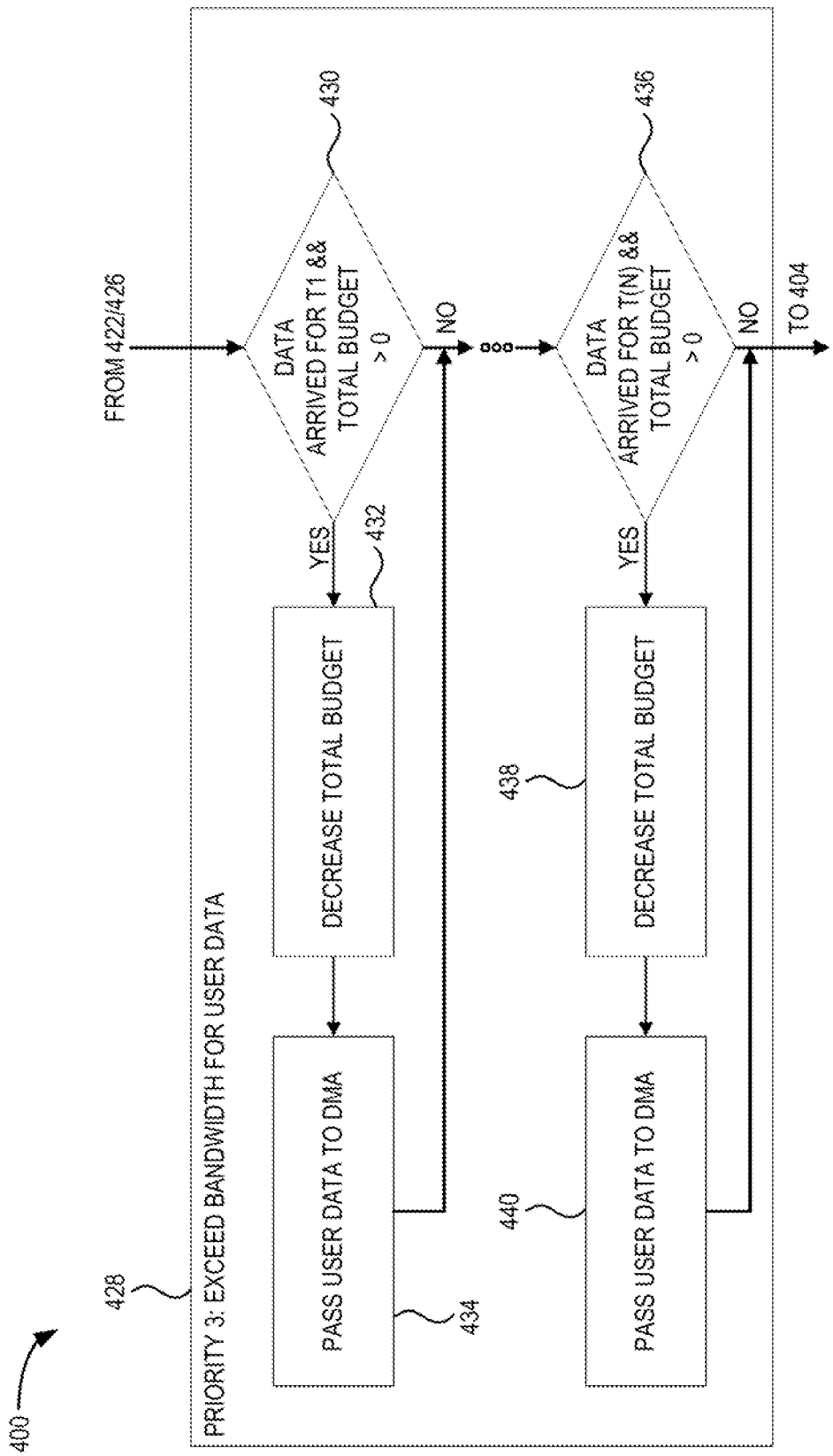

FIGS. 4A-4C depict a flowchart illustrating a method 400 of managing an allocation of bandwidth for a number of tenants, according to certain embodiments. The method 400 may be employed by a bandwidth monitor, such as the bandwidth monitor 310 of FIG. 3. The method 400 includes a first priority 406, a second priority 420, and a third priority 428. The first priority 406 is related to user data within a provided bandwidth. The second priority 420 is related to a remaining bandwidth used for sideband information. The third priority 428 is related to exceeding a bandwidth for user data. In one embodiment, the second priority 420 is prioritized over the third priority 428 as shown in the method 400. In another embodiment, the third priority 428 is prioritized over the second priority 420, where the method 400 continues from the first priority 406 to the third priority 428 before advancing to the second priority 420. In yet another embodiment, the debug information (i.e., sideband data) is considered as a tenant. The free bandwidth (i.e., the bandwidth not utilized) is shared between the tenant associated with the debug information and the excess tenant bandwidth (i.e., the exceeding a bandwidth for user data). The debug information and the user data bandwidth may be balanced based on a criticality (i.e., priority) of the debug information and the amount of user data.

Referring to FIG. 4A, the method 400 starts at block 402. At block 404, the bandwidth budget is initialized for each tenant. The total bandwidth is consumed to the maximum value such that each tenant receives a portion of the total bandwidth. For example, a DMA, such as the DMA 308 of FIG. 3, may be coupled to 4 tenants. If the total bandwidth is about 100 MB/sec, then each of the 4 tenants receives a portion of the total bandwidth of about 100 MB/sec. For example, a first tenant may receive about 25 MB/sec of bandwidth, the second tenant may receive about 10 MB/sec of bandwidth, a third tenant may receive about 35 MB/sec of bandwidth, and a fourth tenant may receive the remaining bandwidth of about 30 MB/sec. In one example, the fourth tenant is associated with debug information. It is to be understood that the previously listed values and any values listed herein are not intended to be limiting, but to provide examples of possible embodiments.

In one embodiment, the total bandwidth may be split evenly between each tenant such that each tenant receives the same amount of bandwidth. In another embodiment, each tenant may receive a different amount of bandwidth. In yet another embodiment, some tenants may receive the same amount of bandwidth and other tenants may receive a different amount of bandwidth. The bandwidth provided to each tenant may be requested by each tenant or appropriated to each tenant by the DMA 308.

At block 408, the controller 304, utilizing a FIM, such as the FIM 314 of FIG. 3, determines if the data has arrived from a memory device, such as the NVM 306 of FIG. 3, for a first tenant (T1) and if the T1 budget is greater than 0, where a budget refers to an allocated or total budget herein. If data has arrived for T1 and the T1 budget is greater than 0, then at block 410, the T1 budget is decreased and the total budget is decreased. For example, if the total budget is about 100 MB/sec and the budget allocated to T1 is about 20 MB/sec, then data requiring about 10 MB/sec of bandwidth decreases the T1 budget to about 10 MB/sec and the total budget to about 90 MB/sec. The T1 budget of about 10 MB/sec and the total budget of about 90 MB/sec corresponds to each respective remaining unused bandwidth. At block 412, the user data associated with T1 is passed to the DMA 308.

After passing the user data to the DMA 308 at block 412 or if data has not arrived for T1 and the budget for T1 is not greater than 0 at block 408, the previous steps (i.e., block 408, block 410, and block 412) are iterated for each of the tenants, such that for an Nth tenant (T(N)) at block 414, the controller 304 determines if the data for the Nth tenant has arrived. If data has arrived for T(N) and the T(N) budget is greater than 0, then at block 416, the T(N) budget is decreased and the total budget is decreased. For example, if the total remaining budget is about 40 MB/sec and the budget allocated to T(N) is about 10 MB/sec, then data requiring about 5 MB/sec of bandwidth decreases the T(N) budget to about 5 MB/sec and the total remaining budget to about 35 MB/sec. The T(N) budget of about 5 MB/sec and the total budget of about 35 MB/sec corresponds to each respective remaining unused bandwidth. At block 418, the user data associated with T(N) is passed to the DMA 308.

After passing the user data associated with T(N) to the DMA 308 at block 418 or if data has not arrived for T(N) and the T(N) budget is not greater than 0 at block 414, the method 400 advances to the second priority 420.

Referring to FIG. 4B, the controller 304, utilizing an information collector, such as the information collector 316 of FIG. 3, determines if there is pending sideband information (info) or debug information stored in a debug buffer, such as the debug buffer 318 of FIG. 3, and if the total budget remaining is greater than 0 at block 422. If there is pending sideband info or debug information stored in the debug buffer 318 and if the total budget remaining is greater than 0 at block 422, then at block 424, the total budget is decreased. For example, the pending sideband info or debug information may require about 5 MB/sec of bandwidth, where the remaining total budget is about 40 MB/sec. The total remaining budget is decreased by the bandwidth required by the sideband info or debug information, such that the new remaining total budget is about 35 MB/sec.

The bandwidth provided for the pending sideband info or the debug information may be bandwidth allocated for the pending sideband info or bandwidth re-allocated from one or more tenants not utilizing all the guaranteed bandwidth amounts allocated to the respective one or more tenants. For example, if T1 has a remaining budget of about 10 MB/sec, then about 5 MB/sec of bandwidth may be reallocated to the data associated with the pending sideband info or debug information. At block 426, the pending sideband info or debug information is passed to the DMA 308. If there is not pending sideband info and if the total remaining budget is not greater than 0 at block 422 or if the pending sideband info has been passed to the DMA 308 at block 426, then the method 400 advances to the third priority 428.

Referring to FIG. 4C, at block 430, the controller 304 determines if additional data has arrived for T1 and if the total remaining budget is greater than 0. If the additional data has arrived for T1 and the total remaining budget is greater than 0 at block 430, then the total remaining budget is decreased at block 432. For example, if the total remaining budget is about 40 MB/sec and the additional data associated with T1 requires about 20 MB/sec, then the new total remaining budget is about 20 MB/sec. At block 434, the additional data associated with T1 is passed to the DMA 308.

After passing the user data to the DMA 308 at block 434 or if data has not arrived for T1 and the total remaining is not greater than 0 at block 430, the previous steps (i.e., block 430, block 432, and block 434) are iterated for each of the tenants, such that for an Nth tenant (T(N)) at block 436, the controller 304 determines if additional data for the Nth tenant has arrived. If data has arrived for T(N) and if the total remaining budget is greater than 0, then at block 438, the total remaining budget is decreased. For example, if the total remaining budget is about 40 MB/sec, then additional data associated with T(N) requiring about 5 MB/sec of bandwidth decreases the total remaining budget to about 35 MB/sec. At block 440, the user data associated with T(N) is passed to the DMA 308.

After passing the user data associated with T(N) to the DMA 308 at block 440 or if data has not arrived for T(N) and the total remaining budget is not greater than 0 at block 436, the method 400 returns to block 404.

Figure 5A:
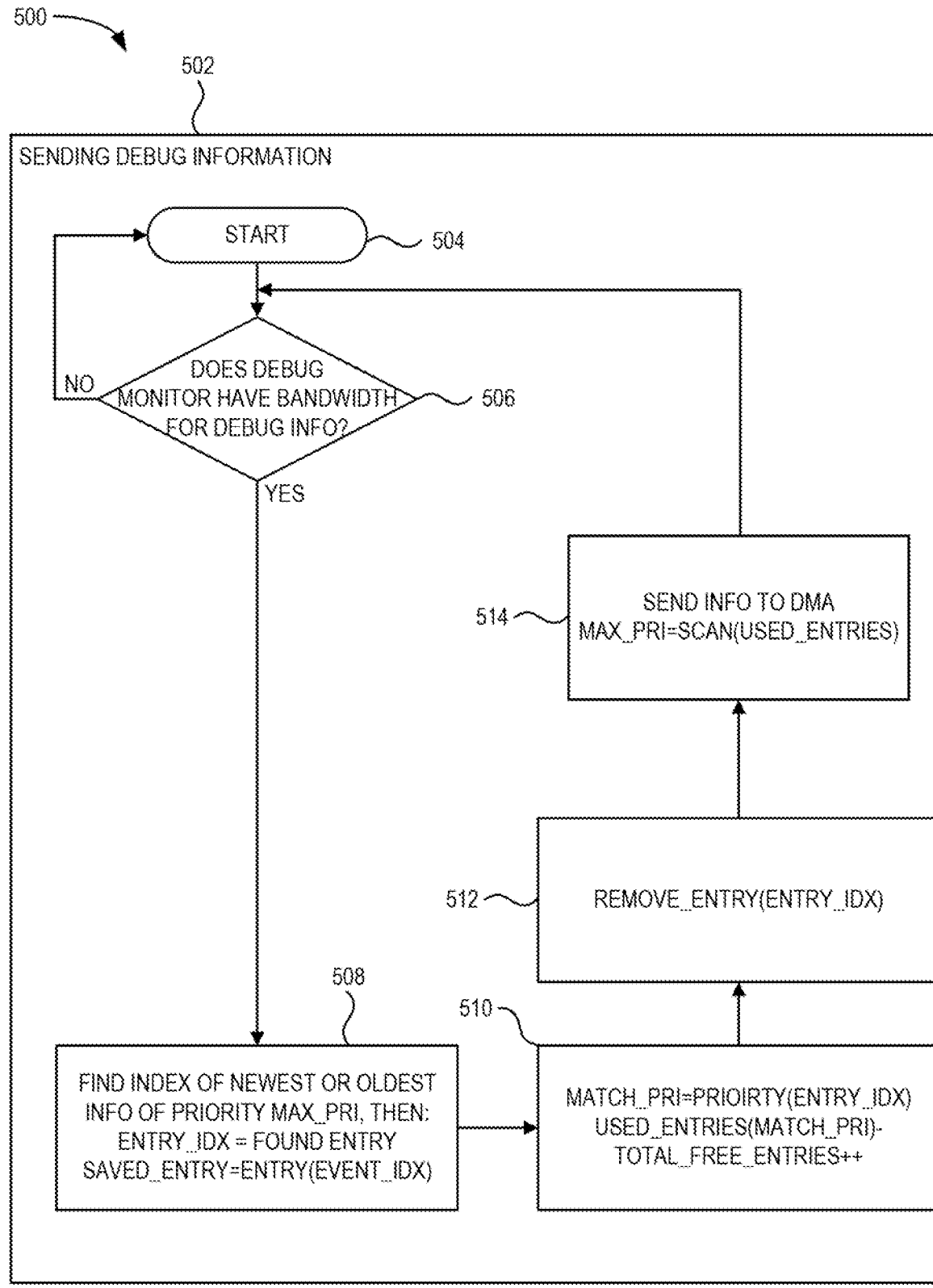
FIGS. 5A-5B depict a flowchart illustrating a method of sending debug information and adding debug information, according to certain embodiments.
Figure 5B:
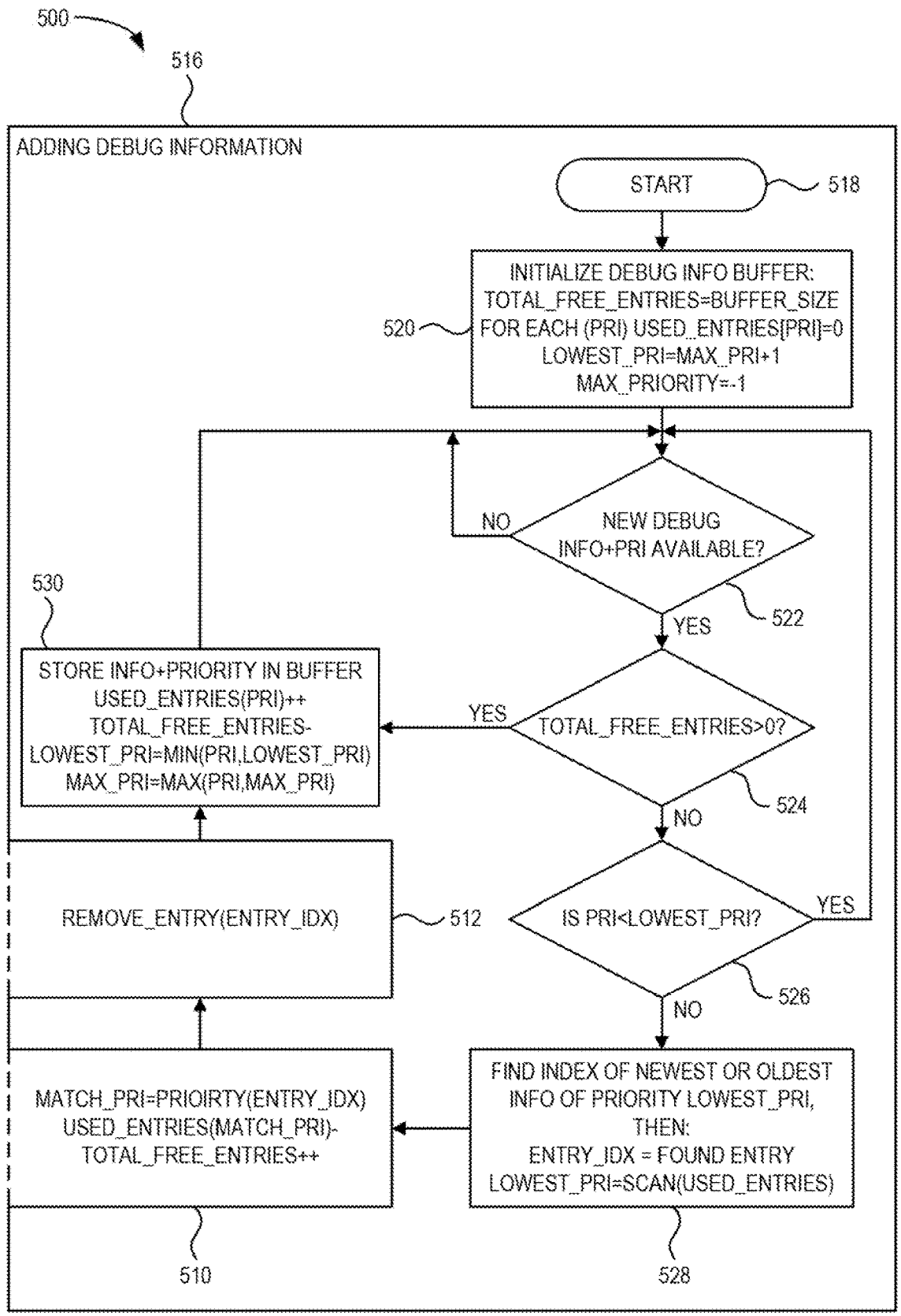

FIGS. 5A-5B depict a flowchart illustrating a method 500 of sending debug information 502 and adding debug information 516, according to certain embodiments. The term debug information may be referred to as sideband information and/or data interchangeably herein. The method 500 may be employed by an information collector of a controller, such as the information collector 316 of the controller 304 of FIG. 3.

Referring to FIG. 5A, the sending debug information 502 begins at block 504. At block 506, the controller 304 determines if a bandwidth monitor, such as the bandwidth monitor 310 of FIG. 3, has bandwidth for debug information. If the bandwidth monitor 310 does not have bandwidth for debug information, then the sending debug information 502 returns to block 504. However, if the bandwidth monitor 310 does have bandwidth for debug information, then, according to one embodiment, at block 508, the information collector 316 finds the index of the oldest sideband info or debug information with the max priority. In another embodiment, the newest sideband info or debug information, such as the most recently received sideband info or debug information, with the max priority is found. For example, when debug information arrives at the information collector 316, the information collector may assign the debug information with a priority based on importance of the debug information and organize the debug information in a debug buffer, such as the debug buffer 318 of FIG. 3, by the priority. The entry index is saved.

At block 510, the relevant counters and variables are updated. At block 512, the entry is removed from the debug buffer 318. At block 514, the debug information associated with the max priority is sent to the DMA 308.

Referring to FIG. 5B, the adding debug information 516 begins at block 518. At block 520, the debug info buffer (i.e., the debug buffer 318) is initialized. The total free entries is set to the size of the buffer and for each of the entries of the debug buffer 318 that arrives, a priority is assigned. At block 522, the controller 304 determines if there is new debug information, including a debug priority associated with the new debug information, available. If there is not new debug information and debug priority information available, the adding debug information 516 waits until new debug information has arrived to the information collector 316. However, if there is new debug information, including the debug priority associated with the new debug information, at block 522, the controller 304 determines if there is unused space in the debug buffer 318 to store the new debut information. If there is room, then the new debug information is stored with the debug priority in the debug buffer 318 and the relevant entries, such as the lowest priority, max priority, and total free entries are updated at block 530.

However, if there is no room in the debug buffer 318 at block 524, then the controller 304 determines if the priority of the new debug information is less than the debug information with the lowest priority in the debug buffer 318. If the priority of the new debug information is less than the debug information with the lowest priority at block 526, then the adding debug information 516 returns to block 522, where the new debug information is ignored. In some embodiments, the debug information with the lowest priority may be removed from the debug buffer 318 without sending the debug information with the lowest priority to the DMA 308 and the new debug information may be stored in the debug buffer 318. However, if the priority of the new debug information is greater than, and in some embodiments, equal to, the debug information with the lowest priority in the debug buffer 318, the controller 304 determines the index of the newest debug information with the lowest priority and updates the index entries at block 528. In some embodiments, the index of the oldest debug information with the lowest priority is determined and the index entries are updated with respect to the index of the oldest debug information.

At block 510, the relevant counters and variables are updated. At block 512, the lowest priority entry is removed from the debug buffer 318 and sent to the DMA 308 at block 514 as exemplified in FIG. 5A. After the entry is removed at block 512, the new debug information is stored with the debug priority in the debug buffer 318 and the relevant entries, such as the lowest priority, max priority, and total free entries are updated at block 530. The adding debug information 516 returns to block 522, where the controller 304 waits to receive new debug information including an associated priority.

By adapting the bandwidth of each tenant to the current workload, sideband information may be provided to a host device without impacting the required performance of the interface protocol.

In one embodiment, a data storage device includes a memory device and a controller coupled to the memory device. The controller is configured to receive new debug information, where the new debug information includes priority information, determine that a debug buffer does not have any available free entries for the new debug information, compare the priority information to a lowest priority information of old debug information stored in the debug buffer, remove either a most recently stored old debug information that has a lowest priority information or a least recently stored old debug information that has a lowest priority information from the debug buffer, and place the new debug information and corresponding priority information in the debug buffer.

The controller is further configured to monitor bandwidth, request debug information from the debug buffer, send debug information from the debug buffer to a direct memory access (DMA) module, and remove debug data from the debug buffer, wherein the removed debug data sent to the DMA. The debug data is removed from the debug buffer prior to being sent to the DMA. The controller is further configured to determine that the debug buffer has space and store debug information in the debug buffer. The controller is further configured to determine whether new debug information has priority information that is less than the priority information of the lowest priority information data in the debug buffer. The controller is further configured to distribute available bandwidth for transmitting data through a DMA among a plurality of tenants. An extra virtual tenant is for debug information. The extra virtual tenant is not included in the plurality of tenants. The remaining available bandwidth is distributed to at least one of the extra virtual tenant and one or more tenants of the plurality of tenants. The DMA includes a bandwidth monitor that distributes the available bandwidth. The controller further includes an information collection module that delivers debug information to a DMA. The information collection module collects debug information and categorizes the debug information according to importance.

In another embodiment, a data storage device includes a memory device and a controller coupled to the memory device. The controller includes a write path, a control path, a flash interface module (FIM), an error correction module coupled to the FIM, and a direct memory access (DMA) module coupled to the error correction module, where the DMA module comprises a bandwidth module, and an information collector module coupled to the control path, the write path, and the DMA. The information collector is configured to receive sideband data from the write path, the control path, the FIM, and the error correction module.

The information collector is configured to deliver the sideband data to the DMA module. The bandwidth module is configured to distribute available bandwidth between user data and debug data. The sideband data is debug data and wherein the debug data has a priority value and a debug data time. The controller is configured to discard either old, low priority debug data or new, low priority debug data. The controller is configured to store either newer, higher priority debug data or newer, equal priority debug data. The debug data is stored in a debug data buffer. The bandwidth module is configured to request debug data to be delivered from the information collector module to the DMA.

In another embodiment, a data storage device includes memory means and controller means. The controller means are configured to collect debug information, collect priority information of the collected debug information, store the debug information and the priority information in a debug buffer, remove old debug information from the debug buffer without sending the old debug information to a DMA, and send remaining debug information from the debug buffer to the DMA after removing old debug information from the debug buffer, where the remaining debug information is distinct from the old debug information.

The remaining debug information has a higher priority rating than the old debug information. The data storage device further includes a bandwidth monitor for requesting debug information from the debug buffer.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive new debug information, wherein the new debug information includes priority information;
determine that a debug buffer does not have any available free entries for the new debug information;
compare the priority information to a lowest priority information of old debug information stored in the debug buffer;
remove either a most recently stored old debug information that has a lowest priority information or a least recently stored old debug information that has a lowest priority information from the debug buffer;
place the new debug information and corresponding priority information in the debug buffer; and
distribute available bandwidth for transmitting data through a direct memory access (DMA) among a plurality of tenants, wherein an extra virtual tenant is for debug information, wherein the extra virtual tenant is not included in the plurality of tenants, and wherein remaining available bandwidth is distributed to at least one of the extra virtual tenant and one or more tenants of the plurality of tenants.

2. The data storage device of claim 1, wherein the controller is further configured to:
monitor bandwidth;
request debug information from the debug buffer;
send debug information from the debug buffer to a direct memory access (DMA) module; and
remove debug data from the debug buffer, wherein the removed debug data sent to the DMA.

3. The data storage device of claim 2, wherein the debug data is removed from the debug buffer prior to being sent to the DMA.

4. The data storage device of claim 1, wherein the controller is further configured to determine that the debug buffer has space and store debug information in the debug buffer.

5. The data storage device of claim 1, wherein the controller is further configured to determine whether new debug information has priority information that is less than or equal to the priority information of the lowest priority information data in the debug buffer.

6. The data storage device of claim 1, wherein the DMA comprises a bandwidth monitor that distributes the available bandwidth.

7. The data storage device of claim 1, wherein the controller further comprises an information collection module that delivers debug information to a DMA.

8. The data storage device of claim 7, wherein the information collection module collects debug information and categorizes the debug information according to importance.

9. A data storage device, comprising:
  means for storing data; and
  a controller coupled to the means for storing data, wherein the controller is configured to:
    collect debug information;
    collect priority information of the collected debug information;
    store the debug information and the priority information in a debug buffer;
    remove old debug information from the debug buffer without sending the old debug information to a direct memory access (DMA);
    send remaining debug information from the debug buffer to the DMA after removing old debug information from the debug buffer, wherein the remaining debug information is distinct from the old debug information; and
    distribute available bandwidth for transmitting data through the DMA among a plurality of tenants, wherein an extra virtual tenant is for the debug information, wherein the extra virtual tenant is not included in the plurality of tenants, and wherein remaining available bandwidth is distributed to at least one of the extra virtual tenant and one or more tenants of the plurality of tenants.

10. The data storage device of claim 9, wherein the remaining debug information has a higher priority rating than the old debug information.

11. The data storage device of claim 9, further comprising a bandwidth monitor for requesting debug information from the debug buffer.

* * * * *